(12) United States Patent
Conner et al.

(10) Patent No.: US 9,102,523 B2
(45) Date of Patent: Aug. 11, 2015

(54) SUPERCHARGED ELECTRON SOURCE IN A SIGNAL EMISSION SYSTEM

(71) Applicants: Jacob Conner, Springfield, MO (US); Ryan Giedd, Springfield, MO (US)

(72) Inventors: Jacob Conner, Springfield, MO (US); Ryan Giedd, Springfield, MO (US)

(73) Assignee: U.S. Photonics, Inc., Springfield, MO (US)

( * ) Notice: Subject to any disclaimer, the term of this patent is extended or adjusted under 35 U.S.C. 154(b) by 492 days.

(21) Appl. No.: 13/621,627

(22) Filed: Sep. 17, 2012

(65) Prior Publication Data
US 2014/0077695 A1    Mar. 20, 2014

(51) Int. Cl.
| | |
|---|---|
| H01J 25/00 | (2006.01) |
| B82Y 15/00 | (2011.01) |
| H01J 25/10 | (2006.01) |
| H01J 25/34 | (2006.01) |
| H01J 25/50 | (2006.01) |
| H01J 23/06 | (2006.01) |

(52) U.S. Cl.
CPC .................. B82Y 15/00 (2013.01); H01J 23/06 (2013.01); H01J 25/10 (2013.01); H01J 25/34 (2013.01); H01J 25/50 (2013.01)

(58) Field of Classification Search
USPC ............. 315/500, 503, 507, 39, 39.51, 39.53, 315/39.57
See application file for complete search history.

(56) References Cited

U.S. PATENT DOCUMENTS

| | | | | |
|---|---|---|---|---|
| 5,694,005 A | * | 12/1997 | Goebel ........................... | 315/39 |
| 6,870,320 B2 | * | 3/2005 | Ratzinger et al. ........ | 315/111.01 |
| 2003/0168986 A1 | * | 9/2003 | Cascone et al. .............. | 315/5.38 |

* cited by examiner

*Primary Examiner* — Douglas W Owens
*Assistant Examiner* — James H Cho
(74) *Attorney, Agent, or Firm* — Da Vinci's Notebook, LLC

(57) ABSTRACT

The present invention includes an electron-discharge signal system with a supercharged electron source and process therefor. The system may be any signal modification unit such as a klystron, magnetron, traveling wave tube, etc. The system includes a heat-responsive electron source, supercharger, collector, a wave modification assembly, and a bleeder module. The electron source discharges an electron beam along a predetermined electron path. The supercharger heats the electron source upon absorption of electromagnetic radiation of a predetermined signal characteristic redirected by the system. The bleeder module redirects a portion of the system's output signal to the supercharger, which heats in response thereto. In other embodiments, the system may be operated entirely by electromagnetic radiation from a freestanding signal source.

18 Claims, 5 Drawing Sheets

SUPERCHARGED ELECTRON SOURCE IN A SIGNAL EMISSION SYSTEM

FIELD OF THE INVENTION

The present invention relates to the field of signal emission components and more specifically to the field of radiofrequency signal applications.

BACKGROUND

Signal emission systems such as klystrons, traveling wave tubes, magnetrons, and the like function by using the properties of an electron beam either to generate an original signal or modify a pre-existing signal. The commonality in many signal emission systems is an electron source and resulting signals derived from the electron beams of the electron source. Many signal emission systems are utilized in environments where power is in limited supply and there are great advantages in increasing the efficiency, and diminishing the input power requirements, of the signal emission systems. A prime example of such a limiting environment is space, and the traveling wave tubes utilized by satellites for signal amplification.

SUMMARY

The present invention is directed to an electron-discharge signal emission system and process. The system may be any electron-discharge signal emission unit such as a klystron, magnetron, traveling wave tube, etc. The system includes a heat-responsive electron source, supercharger, collector, a wave modification assembly, and a bleeder module. The electron source discharges an electron beam along a predetermined electron path. The supercharger heats the electron source upon absorption of electromagnetic radiation of a predetermined signal characteristic. The collector is positioned in the electron path and accepts an electron beam emitted from the electron source. The signal manipulation assembly extracts from the electron beam an output signal. The bleeder module redirects a portion of the output signal to the supercharger, which heats in response thereto. The heated supercharger diminishes the need for an initial current supplied to the electron source to heat the electron source. The initial energy, e.g. current, may be lessened or altogether shut off after the device begins producing radiation and the supercharger begins to absorb energy from the bleeder.

The wave modification process of the present invention includes heating with initial energy the supercharger in thermal communication with the heat-responsive electron source. The electron beam is discharged from the electron source along the predetermined path. The collector, positioned on the predetermined electron path, collects the electron beam. The input signal is modified by injecting it into the electron beam to generate the modified signal. The output signal is derived from the electron beam. A portion of the output signal having the predetermined wave characteristic is diverted via a bleeder module to radiate the supercharger. The electron source may continue to be heated via current.

Therefore, it is an aspect of the present invention to lessen the amount of energy needed to use signal modification systems, such as klystrons, magnetrons, and traveling wave tubes.

It is a further aspect of the present invention to diminish the internal structure needed to operate signal modification systems, such as klystrons, magnetrons, and traveling wave tubes.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

DETAILED DESCRIPTION

Figure 1:
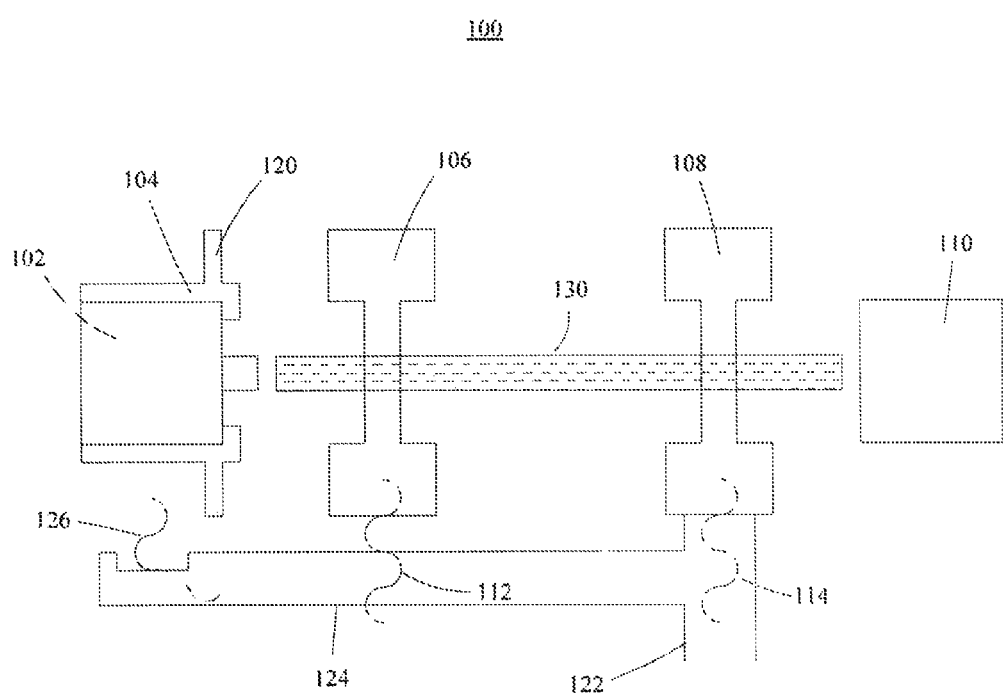
FIG. 1 is a plan view of the system of the present invention.

Referring first to FIG. 1, a basic embodiment of the electron-discharge signal emission system 100 is shown. The system 100 may include any signal modification system 100 such as magnetrons, klystrons, traveling wave tubes, and the like. Signal emission systems have commonalities, usually an electron source 102, a collector 110, and a signal manipulation assembly. The signal manipulation assembly will generally include system constituents for the generation of an original signal or constituents for the modification of a preexisting signal. Signal manipulation assembly may include a signal injector 106 and a signal extractor 108 for modification of a pre-existing input signal 112. In operation, an electron source 102 is activated to create an electron beam 130 of predetermined orientation. In a traveling wave tube, for example, an electron gun, usually a heated cathode, emits an electron stream into an RF circuit. The RF circuit may include either a wire, commonly helical, or coupled cavity.

The RF circuit may be a constituent of the signal manipulation assembly. Other common constituents of the signal manipulation assembly may include a signal injector 106 and signal extractor 108. The radiofrequency injector may include a directional coupler, usually a waveguide or an electromagnetic coil, fed with a signal that is to be amplified, and is positioned near the electron source, and, in some embodiments induces a current along an RF circuit. The purpose of the RF circuit is to reconcile the velocity of both the signal and electron beam to be approximately equivalent. The electromagnetic field due to the signal in the RF circuit interacts with the electron beam, causing bunching of the electrons (an effect called velocity modulation), and the electromagnetic field due to the electron beam current then induces more current back into the RF circuit. The current builds up and thus is amplified as it passes down. The signal extractor is positioned near the collector, extracts an amplified modified signal 114 version of the input signal 112 from the far end of the RF circuit. Attenuators may be placed along the RF circuit to prevent any reflected waves from traveling back to the electron source. The collector 110 collects electrons from the electron beam and operates generally as an anode.

It is preferred the output signal 114 include microwave frequencies. The microwave signals depart through the signal extractor for the intended use of the emission system. Immediately proximate to the signal extractor is the bleeder module 124. The bleeder module 124 redirects portions of the outbound modified signals back toward the supercharger 104. The supercharger 104 heats upon absorption of the signals of a predetermined characteristic. It will generally be the case that the predetermined characteristic to which the supercharger is attuned will be the characteristics of the output signal or some derivative thereof. The supercharger 104 is herein described as a supercharger because the introduction of field radiation therefrom increases the efficiency of the electron source moreso than electron sources that rely wholly on current for heat for thermionic emission. An operational energy potential from both an initial energy, that is applied directly to the electron source, and the bleeder module's radiation, which in turn heats the supercharger to provide heat energy to the electron source, permits a combined energy well in excess of that supplied only by current.

Rather than utilize the supercharger 104 to create a superheated system, it is instead preferred that the current energy supplied to the electron source 102 be diminished to a degree that the system 100 maintains an optimum steady state. In other words, if the system is found to optimally operate when energy amount $E_{opt}$ is supplied to the electron source, then the energy initially supplied to the electron source via current, $E_{cur}$, should equal $E_{opt}$. As the system begins to generate microwaves at a steady state, and those microwaves are portionally diverted back toward the supercharger, then the energy of supercharger, $E_{sup}$, then $E_{cur}$ should be diminished. It is preferred that $E_{opt}=E_{cur}+E_{sup}$. Thus, the present invention is an advantageous advance in systems having limited power, such as satellites. A system with a limited power input would be able to operate as though it possessed greater power input and with greater efficiency.

The bleeder module 124 is a system constituent signal source that directs a downstream, modified wave 114 emitted by the system 100 back to the supercharger 104. The preferred bleeder module 124 is a waveguide. The waveguide can be as conventional as a hollow conductive metal pipe used to carry high frequency radio waves, particularly microwaves. Waveguides differ in their geometry, which can confine energy in one dimension such as in slab waveguides, or two dimensions, as in fiber or channel waveguides. Different waveguides are needed to guide different frequencies, so having a predetermined signal characteristic of the system is a significant advantage. As a rule of thumb, the width of a waveguide needs to be of the same order of magnitude as the wavelength of the guided wave.

The bleeder tube 124 preferably conducts the output, or modified, signal 114 unaltered from the signal extractor 108 to the absorption signal 126 that leaves the bleeder module. However, the bleeder module 124 may include signal-altering constituents that modify the extracted signal 114, that does not have characteristics that are not well absorbed by the supercharger, into an absorption signal 126 with characteristics substantially identical to those signal characteristics best absorbed by the supercharger. Silver plating used on the inside walls of the waveguide decreases the resistance loss making the aluminum or copper waveguides even more efficient. The end of a waveguide can be shaped to radiate in a pattern amenable to substantial absorption by the supercharger. In preferred embodiments of the invention, however, either the signal emitted by the system will be chosen to be substantially identical to the signal best absorbed by the supercharger, or vice versa. The preferred signal of the present system is a microwave signal of 2-3 GHz—and more preferably 2.450 GHz—which is absorbed well by the preferred supercharger constituent material, carbon nanotubes. Other wave conducting apparatus may be used with the present invention, including coaxial cable Turning now to FIGS. 2-4, the electron source 102 of the present invention is depicted. The electron source 102 may be a cathode or filament structure as may be present in any traveling wave tube, magnetron, klystron, or the like. One such electron source may include a thoriated, tungeten filament. Thoriated filaments are typically present in high-power tubes as the thoriated filament possesses substantial longevity and is very resistant to high voltages. However, because the supercharger of the present invention obviates the need for conventional current strengths oxide-coated filaments may be utilized. This can be either just a filament coated with a mixture of barium and strontium oxides and other substances, or it can be an "indirectly heated" cathode, which is just a nickel tube with a coating of these same oxides on its outer surface and a heating filament inside. The cathode (and oxide coating) is heated orange-hot, but not as hot as the thoriated filament—about 1000 degrees Celsius. These oxides are even better at making electrons than the thoriated filament. Because the oxide cathode is so efficient, it is used in nearly all smaller glass tubes. It can be damaged by very high voltages and bombardment by stray oxygen ions in the tube, however, so it is rarely used in relatively powerful tubes. Higher powered helical tubes, such as traveling wave tubes, usually contain beryllium oxide ceramic as both a helix support rod and in some cases, as an electron collector for the tube because of its special electrical, mechanical, and thermal properties.

Figure 2:
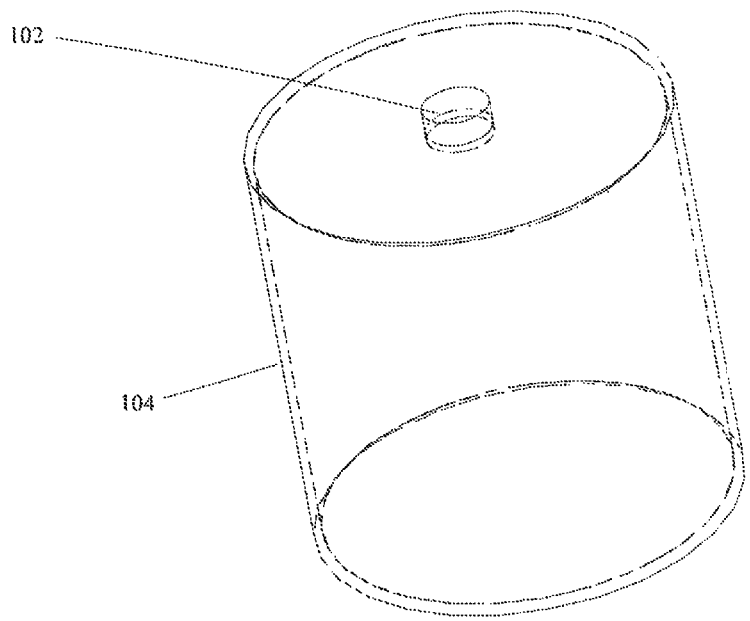
FIG. 2 is an orthographic view of the electron source and CNT jacket of the present invention.
Figure 3:
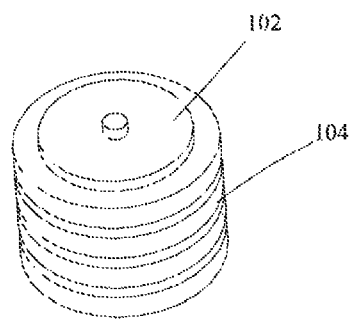
FIG. 3 is an orthographic view of an embodiment of the electron source and supercharger assembly of the present invention.
Figure 4:
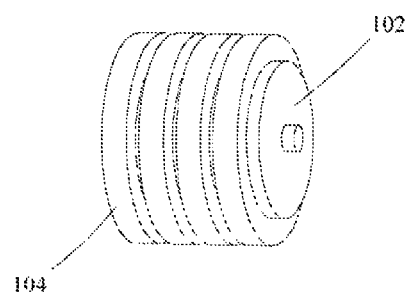
FIG. 4 is an orthographic view of an embodiment of the electron source and supercharger assembly of the present invention.

Proximate to the electron source 102, the supercharger 104 is positioned. The preferred supercharger 104 is a carbon nanotube (CNT) jacket that coats the electron source as shown in FIG. 2. The supercharger need only have such structure as is advantageous to accept enough absorption to substantially heat the electron source. By substantially heat, it is meant that purely through absorption of electromagnetic radiation, the supercharger can transmit heat energy to the electron source to a measurable degree that permits a controllable diminishment in current to the supercharger without an unexpected diminishment in electron discharge from the electron source. As shown in FIGS. 3-4, the supercharger structure may include one or more annular rings of CNT material. As shown in FIG. 1, the supercharger may include surface area enhance structure, e.g. fins 120, to enhance the efficiency at which it absorbs electromagnetic radiation. It is preferred that the size and configuration of the supercharger is coordinated with the orientation and configuration of any output from the bleeder module.

There are multiple methods for depositing single wall CNT and multiple wall CNT films and coatings from a non-woven mat of tangled nanotubes and ropes of tubes to be mostly oriented in a vertical direction attached at the surface. The non-woven mats are produced by spray coating, airbrushing, aerosol spray coating of a solvent or aqueous based CNT solution. The carpet like films are grown via pulsed laser deposition and/or chemical/physical vapor deposition methods in a reactor chamber. CNT structures make admirable candidates for the supercharger because they are heat-tolerant well in excess of temperatures required to cooperate with conventional electron sources. Another advantage of the strongly RF/microwave absorbent CNT films is the sharpness of the tips and the high conductivity of metallic-like CNT's. The sharp tips act as field emission radiators improving the electron current and increasing the efficiency of the thermionic emission.

Figure 6:
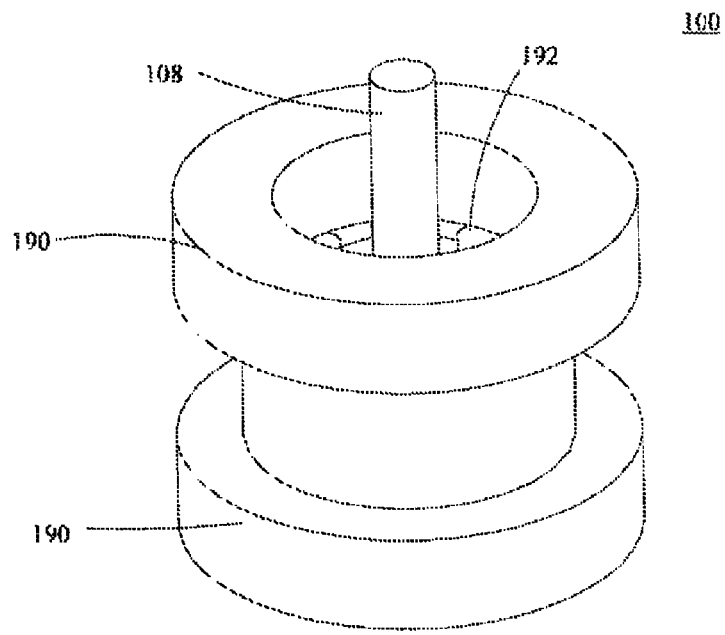
FIG. 6 is a view of the system of the present invention.
Figure 7:
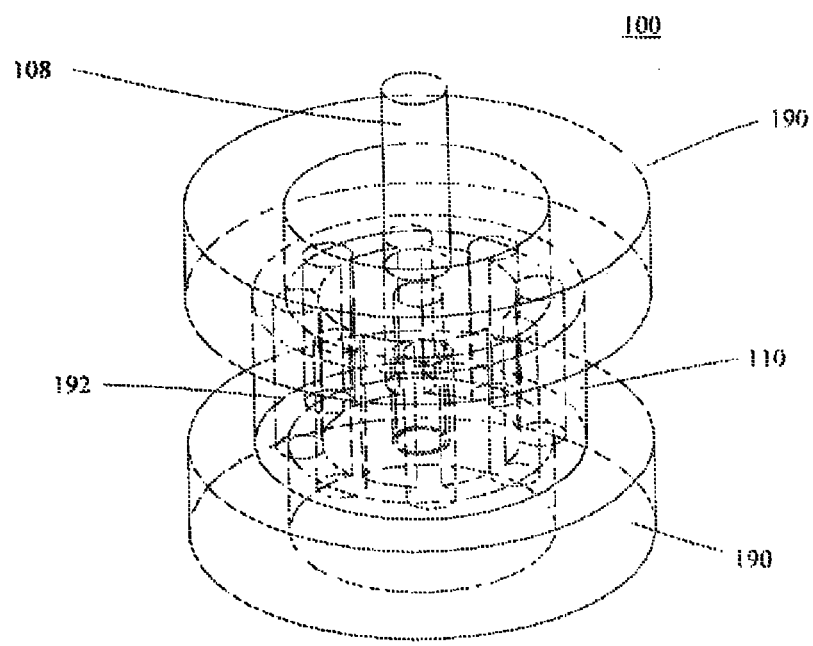
FIG. 7 is a view of the system of the present invention.
Figure 8:
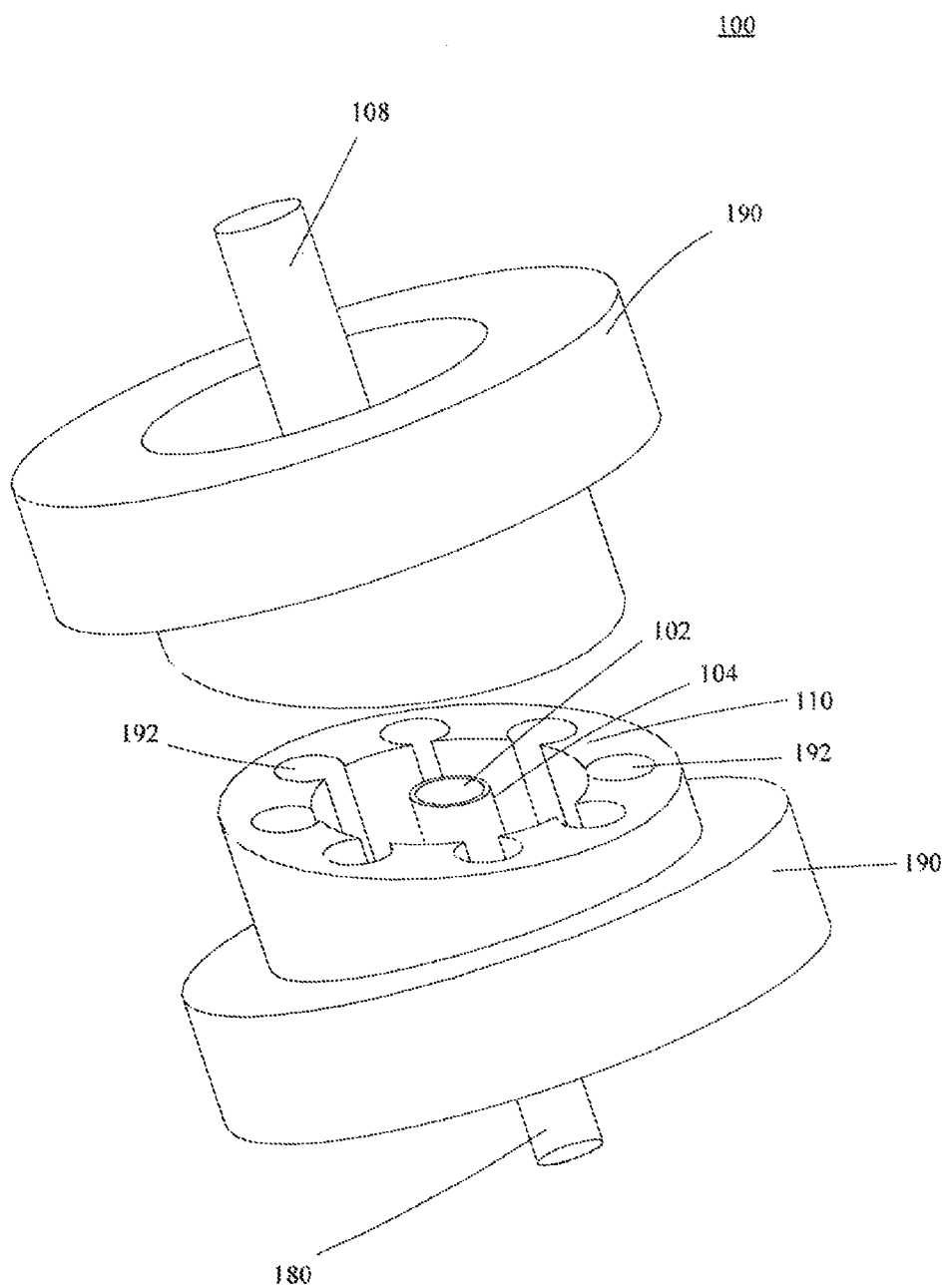
FIG. 8 is a view of the system of the present invention.

As shown in FIGS. 6-8, a magnetron embodiment of the present invention is shown. The magnetron system 100 as a signal generation system differs moderately from signal alteration systems as shown in FIG. 1, none of which substantially affect the applicability of supercharging an electron source. The preferred system 100 includes an electron source 102 with the preferred CNT jacket embodiment 104. In the magnetron system where the electron beam path will be annular, rather than linear as in signal alteration embodiments, it is preferred that the CNT jacket not traverse the entirety of the magnetron's typically elongate electron source, longitudinally. Instead, the jacket may traverse a predetermined length of the electron source, annular rings may be used, CNT depositions may be clustered along the surface of the electron source, etc. Furthermore, the magnetron system lacks a signal injector that operates in tandem with the electron beam. Instead, the genesis of any modified, output signal is the electron beam discharged from the electron source that spiral in the annular electron beam path between the electron source and the collector 110.

The collector 110, which acts as the anode of the magnetron draws electrons into it that cause cavities therein to vibrate and create a modified, output signal as dictated by the strength and configuration of the signal manipulation assembly. The signal manipulation assembly of the cavity magnetron includes the features that control the attributes of the signal desired to emanate from the magnetron system. These features include the cathode cavities 192, the characters of which lead to the characteristics of the resulting signal, and the magnetic field magnets that control the spiraling action of the discharged electrons in the annular electron beam path. The signal extractor 108, which receives signals from the cavities 192 via a waveguide (not shown), directs a portion of the system-generated-signals back to the supercharger via a bleeder module (not shown).

The present invention may also be applied to klystrons, which work similarly to magnetrons with alterations in the signal manipulation assembly and is shown in FIG. 1. Examples of klystron structure to which the present invention may be applied is exhibited in U.S. Pat. Nos. 4,216,409; 4,591,799; and 4,700,146, the teachings of which are incorporated herein by reference. The primary difference includes constituents that amplify an input signal so that its output signal may be precisely controlled in amplitude, frequency, and phase. The system may be applied to traveling wave tubes, which commonly rely a signal manipulation assembly that includes a signal injector, magnets for creating an electric field in the direction of the electron beam, an attenuator, and a signal extractor. Examples of traveling wave tube structure to which the present invention may be applied is exhibited in U.S. Pat. Nos. 7,579,778 and 6,909,235 and U.S. Publ. Pat. App. No. 2006/0028144, the teachings of which are incorporated herein by reference. The electron beam path of a traveling wave tube may be helical, rather than the earlier discussed annular or linear electron beam paths. The system may even be applied to any radiofrequency generation system that relies on electron discharge, includes any vacuum tube-type system. The modern vacuum tube includes many of the commonalities of the other systems discussed herein, but may also include control grids, screen grids, suppressors, etc.

Figure 5:
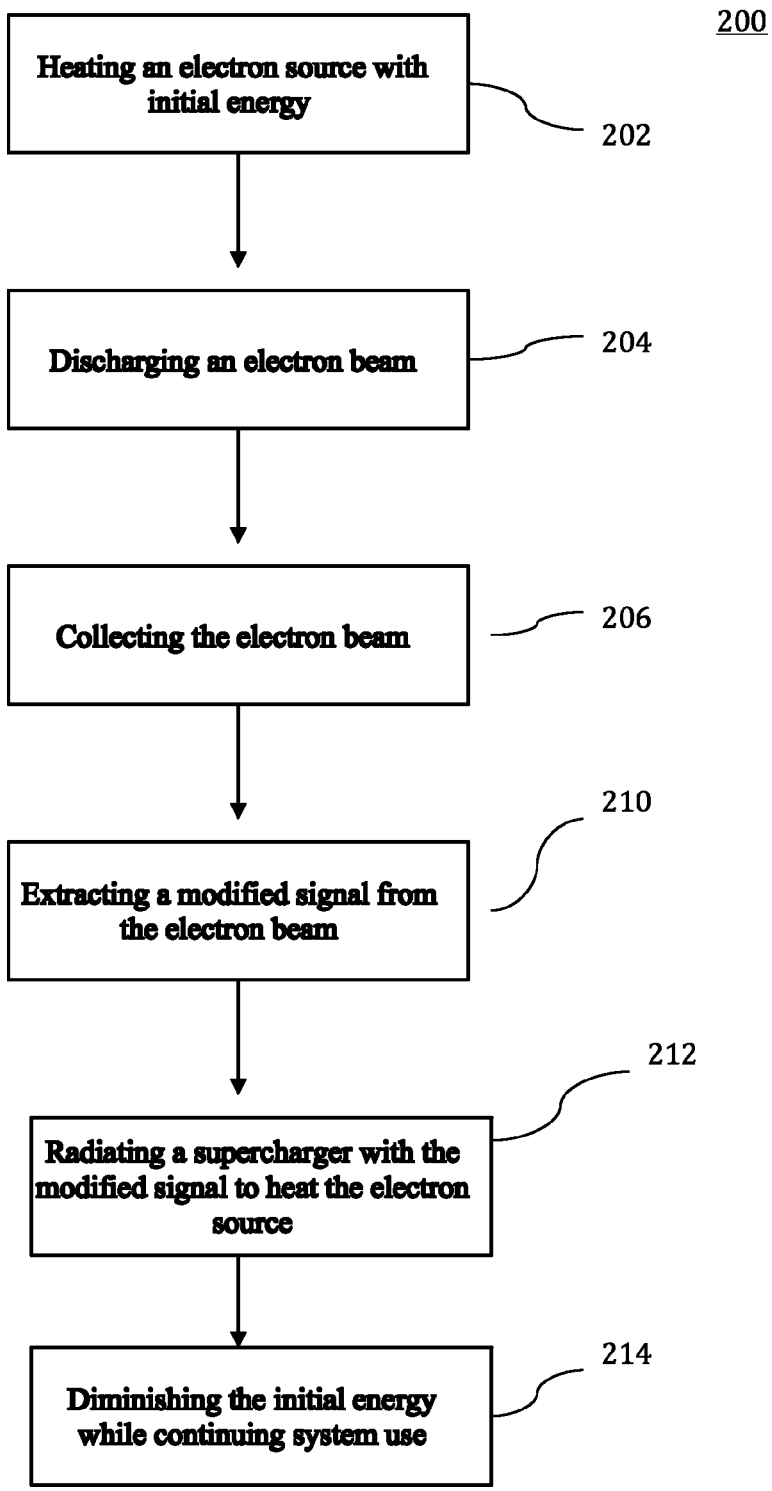
FIG. 5 is a view of the process of the present invention.

Turning now to FIG. 5, the process 200 of the present invention includes heating 202 the electron source with initial energy. The initial energy is preferably composed solely of electric current that may be introduced into the electron source to heat the electron source. Any form of energy may be supplied to the electron source as the initial energy. The initial energy is the energy supplied to the electron source to create the "electron boiling" discharge associated with tube-type, and other electron discharge, signal systems. The electron source is in thermal communication with the supercharger. Thermal communication means that the supercharger is capable of transferring heat energy to the electron source via any known means of heat transfer. The preferred means of thermal communication is simple proximity positioning, even more preferably layered one upon the other.

Because the supercharger is in thermal communication with the electron source, the initial energy may include electromagnetic radiation energy directed to the supercharger. The electron source may be activated entirely, substantially, barely, or not at all by an initial bombardment of electromagnetic radiation from a non-cyclical signal source. Although the present invention may operate through use of a bleeder module to redirect a generated downstream signal, i.e. a signal created by operating the system, back to an earlier stage of the system, specifically the beginning, the present invention may also rely on a freestanding signal source that does not require operation of the system or process as a precondition to signal creation. An exemplary freestanding signal source 180 is depicted in FIG. 8. The freestanding signal source 180, need not be positioned upstream in the system or process or rely on the operation of the system or process to create a signal. Instead, the preferred freestanding signal source 180 may rely on current for its operation. The preferred freestanding signal source 180 is positioned proximate to the supercharger 104 such that the supercharger 104 effectively absorbs the independent signal generated thereby, but does not interfere with the signal from a bleeder module, when present in the system or process. By independent signal, it is meant a signal that is not derived from the downstream steps of the process, that is to say, the independent signal is not the output signal or a derivative thereof.

Returning to FIG. 5, the electron source discharges 204 an electron beam along a predetermined electron path. By predetermined electron path, it is meant that the electrons are conducted by a structure or a substantial number of electrons, i.e. a quantity sufficient to perform the purpose of system, travel along a mathematically predicable course. The electron beam is collected 206 with a collector positioned on the predetermined electron path. An output signal derived from the electron beam is extracted 210. A signal derived from the electron beam is any signal whose existence can be traced to an electron beam foundation. A signal's existence can be traced to an electron beam foundation for multiple reasons, including use of an electron beam to modify (including amplify) a pre-existing, injected signal (e.g., a traveling wave tube), use of an electron beam to create a signal where none existed previously (e.g., a magnetron) but the electron beam is the genesis of a resulting signal, or other process.

The supercharger may then be radiated 212 with a portion of the output signal, or derivative thereof, which has a predetermined signal characteristic to which the supercharger is thermally responsive. In systems and processes wholly powered by a freestanding signal source, the supercharger is preferably not radiated by the output signal. The signal is redirected by use of the bleeder module of the present invention. As previously discussed, the field energy supplied by signal radiation obviates the need for the level of thermionic energy initially supplied to the electron source. The initial energy may be lessened such that the combination of thermionic energy and field energy equals the energy that would otherwise be used to operate the system at its optimal level. In other words, if the system is found to optimally operate when energy amount $E_{opt}$ is supplied to the electron source, then the energy initially supplied to the electron source via current, $E_{cur}$, should equal $E_{opt}$. As the system begins to generate microwaves at a steady state, and those microwaves are portionally diverted back toward the supercharger, then the energy of supercharger, $E_{sup}$, then $E_{cur}$ should be diminished 214. It is preferred that $E_{opt}=E_{cur}+E_{sup}$. Thus, the present invention is an advantageous advance in systems having limited power, such as satellites. A system with a limited power input would be able to operate as though it possessed greater power input and with greater efficiency. The preferred scenario in which to diminish 214 the initial energy input to the electron source occurs when a predetermined energy threshold may be reached by the portional redirection of signals via the bleeder module. For example, it may be predetermined when the bleeder module may be relied upon to supply ⅕ of the optimum energy supplied to the electron source. In response to the additional energy supplied to the electron source via the radiated supercharger, the energy supplied by current may be reduced by ⅕, or the amount the supplied by radiation.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An electron-discharge signal emission system comprising:
    a heat-responsive electron source for discharging an electron beam along a predetermined electron beam path;
    a supercharger, in thermal communication with said heat-responsive electron source, adapted to heat upon absorption of electromagnetic radiation of a predetermined wave characteristic;
    a collector distally positioned from said heat-responsive electron source in said predetermined electron path;
    a signal manipulation assembly adapted to extract an output signal derived from said electron beam; and
    a bleeder module, adapted to extract and directionally radiate a portion of said output signal with said predetermined wave characteristic to said supercharger.

2. The system of claim 1 wherein said signal manipulation assembly is adapted to extract said output signal having said predetermined wave characteristic from said electron beam.

3. The system of claim 2 wherein said supercharger includes a CNT absorption layer.

4. The system of claim 3 wherein said supercharger includes a CNT jacket.

5. The system of claim 3 wherein said output signal includes a microwave.

6. The system of claim 3 wherein said system is a klystron.

7. The system of claim 3 wherein said system is a traveling wave tube.

8. The system of claim 3 wherein said system is a magnetron.

9. An electron-discharge signal emission process comprising:
    heating with initial energy consisting of signal radiation from a freestanding signal source oriented to radiate a heat-responsive electron source in thermal communication with a supercharger and oriented in a signal path of said signal source having a predetermined signal characteristic, wherein said supercharger is adapted to heat upon absorption of electromagnetic radiation of said predetermined signal characteristic and conduct heat to said heat-responsive electron source sufficient to discharge electrons therefrom;
    discharging from said electron source an electron beam along a predetermined electron path;
    collecting said electron beam with a collector positioned on said predetermined electron path; and
    extracting an output signal derived from said electron beam.

10. The process of claim 9 wherein said heating step includes continued heating of said supercharger with energy consisting of signal radiation from a freestanding signal source.

11. The process of claim 9 further comprising the step of radiating from a bleeder module said supercharger with a portion of said output signal having said predetermined signal characteristic.

12. The process of claim 11 wherein said initial energy consists of electrical current.

13. The process of claim 11 further comprising the step of diminishing said initial energy at a predetermined electromagnetic radiation threshold.

14. The process of claim 9 wherein said initial energy includes electromagnetic radiation.

15. The process of claim 9 wherein said extracting step further includes extracting said output signal as a modified signal from an input signal injected into said electron beam.

16. An electron-discharge signal emission system comprising:
    a heat-responsive electron source for discharging an electron beam along a predetermined electron beam path;
    a supercharger, in thermal communication with said heat-responsive electron source, adapted to heat upon absorption of electromagnetic radiation of a predetermined signal characteristic;
    a collector distally positioned from said heat-responsive electron source in said predetermined electron path;
    a signal manipulation assembly adapted to extract an output signal derived from said electron beam; and
    a freestanding signal source, oriented to radiate said supercharger with an independent signal of said predetermined signal characteristic, capable of generating said predetermined signal characteristic independent of said signal manipulation assembly.

17. The system of claim 16 further comprising a bleeder module, adapted to extract and directionally radiate a portion of said output signal with said predetermined signal characteristic to said supercharger.

18. The system of claim 16 wherein said supercharger includes a CNT absorption layer.

* * * * *